United States Patent [19]
Troccoli

[11] 3,860,741
[45] Jan. 14, 1975

[54] STRESS CONE
[75] Inventor: Arthur M. Troccoli, Old Bridge, N.J.
[73] Assignee: Thomas & Betts Corporation, Elizabeth, N.J.
[22] Filed: Jan. 18, 1974
[21] Appl. No.: 434,549

[52] U.S. Cl............................................. 174/73 R
[51] Int. Cl.......................................... H02g 15/02
[58] Field of Search............ 174/73 R, 73 SC, 75 D, 174/80; 339/60 R, 61 R, 143 R, 143 C

[56] References Cited
UNITED STATES PATENTS

| | | | |
|---|---|---|---|
| 3,335,215 | 8/1967 | Huber | 174/73 R |
| 3,352,962 | 11/1967 | Brown et al. | 174/73 R |
| 3,725,846 | 4/1973 | Strain | 174/73 R UX |
| 3,736,505 | 5/1973 | Sankey | 174/73 R UX |

FOREIGN PATENTS OR APPLICATIONS

| | | | |
|---|---|---|---|
| 1,408,279 | 7/1965 | France | 174/73 R |
| 1,042,590 | 9/1966 | Great Britain | 174/73 R |
| 1,068,593 | 5/1967 | Great Britain | 174/73 R |
| 47,340 | 12/1039 | Netherlands | 174/73 R |

OTHER PUBLICATIONS
Pamphlet entitled "Termi-Matic Cable Termination Systems," published by General Electric Co., Oct. 1969, 8 pages.

Primary Examiner—Laramie E. Askin
Attorney, Agent, or Firm—David Teschner; Jesse Woldman

[57] ABSTRACT

An improved termination device for terminating the electrically conductive shield of a high voltage cable and which provides means for terminating the concentric neutral conductors of a high voltage cable to the termination device and which provides an easy means for connecting the termination device to ground such as to dissipate any potential built up on the electrically conductive shield of such cable. The termination device is constructed of an inner member of electrically insulating elastomeric material having molded thereabout, over at least a portion of its outer surface, an outer member of electrically conductive elastomeric material having thereupon a fin in which is placed a means such as an aperture for receipt therein of one of the concentric neutral wires of such cable and which facilitates the connection of the termination device to a grounding point to permit the termination device to be maintained at ground potential and dissipate any potential built up. An annular ring, offset from the remaining portion of the terminating device increases the leakage path from the conductive shield of the high voltage cable to the bared conductive portion of the cable along the outer surface of the stress cone.

3 Claims, 3 Drawing Figures

PATENTED JAN 14 1975          3,860,741

STRESS CONE

BACKGROUND OF THE INVENTION

1. Field of the Invention

The invention is directed to the field of terminating the electrically conductive shield of a high voltage cable to a grounding point in order that the potential built up upon the electrically conductive shield of such cable be dissipated to ground. Such devices, known as stress cones, effectively prevent the build up of a potential at any point along the surface of the cable and thereby prevent corona discharge which might be destructive of the cable and any devices connected thereto.

2. Description of the Prior Art

According to the prior art, devices provided for terminating the electrically conductive shield of a high voltage cable operated by means of direct contact between an electrically conductive elastomeric portion of the terminating device and the electrically conducting shield of a high voltage cable. In such cases it was necessary to provide an accurate, low resistance contact between the portion of the terminating device, or stress cone, and the outer electrically conductive layer, or shield, of the cable. The presence of any dirt, grease, oil or the like which would interfere with the contact provided a high resistance to the flow of the charge and thereby resulted in a build up of charge which might break down the dielectric strength of the air or insulation, between the cable and adjacent cables or other devices to which they were connected resulting in a corona discharge which might be destructive of the cable or such ancillary equipment. Further, the resiliency of the terminating device itself was required and depended upon, for sure intimate contact between the electrical conductive shield of the cable and the terminating device. A gap, or misshaping, or mismatching of the size of the cable to the terminating device, could easily cause mismatching and lack of proper contact between the stress cone and the cable surface. In the patent to Brown et al., U.S. Pat. No. 3,352,962 issued Nov. 14, 1967, the outer conductive sleeve of a stress cone is arranged to have two discrete passage diameters such that contact will be made between the outer conductive shield and the insulation of the high voltage cable at a first diameter and the electrical conductive sleeve and the outer electrically conductive shield in a second diameter thereby any air trapped would be held within a space enclosed by the electrically conductive shield of the cable and the sleeve of the electrically conductive elastomer whereby all air would be held at an equal potential level to prevent corona discharge and destruction of the stress cone. However, as was pointed out above, the correct contact between the electrically conductive sleeve of the stress cone and the outer electrically conductive shield of the cable is essential in order that cable and stress cone be maintained at the same potential and thereby prevent any corona discharge between the two. Mismatching of the relative sizes of the two components and the presence of dirt or other impurities, as was noted above, would easily prevent a good electrical contact and path which might result in a corona discharge destructive of the stress cone and adjacent equipment.

SUMMARY OF THE INVENTION

The present invention overcomes the difficulties noted above with respect to prior art devices particularly that of Brown et al by providing a stress cone for terminating the electrically conductive shield of a high voltage cable which employs the concentric neutral wires found on such high voltage cables to connect the electrically conductive shield of the high voltage cable to the electrically conductive outer member of the stress cone and thereby assure that the shield and outer member will be held at the same potential and thereby prevent any destruction to either the stress cone or the cable placed therein for termination. In a first embodiment, the inner member is molded from resilient, insulating elastomeric material such as rubber and formed with dual diameter passages therethrough. The first of the passages has a diameter large enough to allow the entire cable, the central conductor, its insulating layer and the outer electrically conductive shield to pass therethrough while the second passage has a diameter only large enough to permit the central conductor and its surrounding insulation to pass through. The second passage is positioned adjacent to and communicating with the first passage. At the interface, between the two passages, there is created a terminal shoulder against which the terminal rim of the cable, caused by the severance of a portion of the outer electrically conductive shield from the cable, may butt. Also coupled to the inner member is an annular ring shaped apart from the main body of the termination device, for the reasons to be set forth below.

Extending along a portion of the outer surface of the inner member is an outer member fabricated from resilient conducting elastomeric material such as, carbon filled rubber, which along its common jointure with the insulating elastomeric material is formed in a void free manner to prevent the inclusion of air which might cause the corona destruction of the terminating device or connected cable. An annular ring of elastomeric conducting material is coupled to the annular ring of elastomeric insulating material, the two providing, by means of the offset annular ring portion, an increase in the overall tracking path, or leakage path, between the electrically conductive shield of the cable as it enters into the termination device or stress cone and the shield bared conductor which exits from the termination device or stress cone on the opposite end thereof along the surface of the termination device. Also, coupled to an outer surface of the outer member is a fin which has therein an aperture for receipt of one of the concentric neutral wires wound about the cable and which can also be used to connect the overall stress cone to a grounding point. In a second embodiment, the stepping of the inner member is omitted and the outer member is extended adjacent the terminal shoulder to contact the electrically conductive shield of the cable as the same enters the termination device or stress cone. It is therefore an object of this invention to provide an improved device for terminating the electrically conductive shield of a high voltage cable.

It is a further object of this invention to provide an improved method of terminating an electrically conductive shield of a high voltage cable employing the concentric neutral wire carried thereby.

It is still another object of this invention to provide an improved terminating device for a high voltage cable having an electrically conductive shield thereabout which does not depend upon contact between the electrically conductive shield of the cable and an elastomeric conducting member of the terminating device.

Other objects and features of the invention will be pointed out in the following description and claims and illustrated in the accompanying drawings, which disclose, by way of example, the principles of the invention and the best modes which have been contemplated for carrying them out.

BRIEF DESCRIPTION OF THE DRAWINGS

In the drawings in which similar elements are given similar reference characters.

DESCRIPTION OF THE PREFERRED EMBODIMENTS

Figure 1:
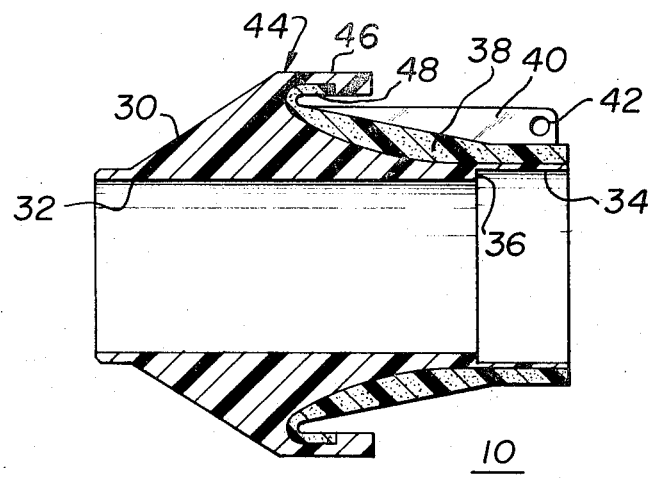
FIG. 1 is a side elevational view, in section, of a termination device or stress cone constructed in accordance with the concepts of the invention.
Figure 3:
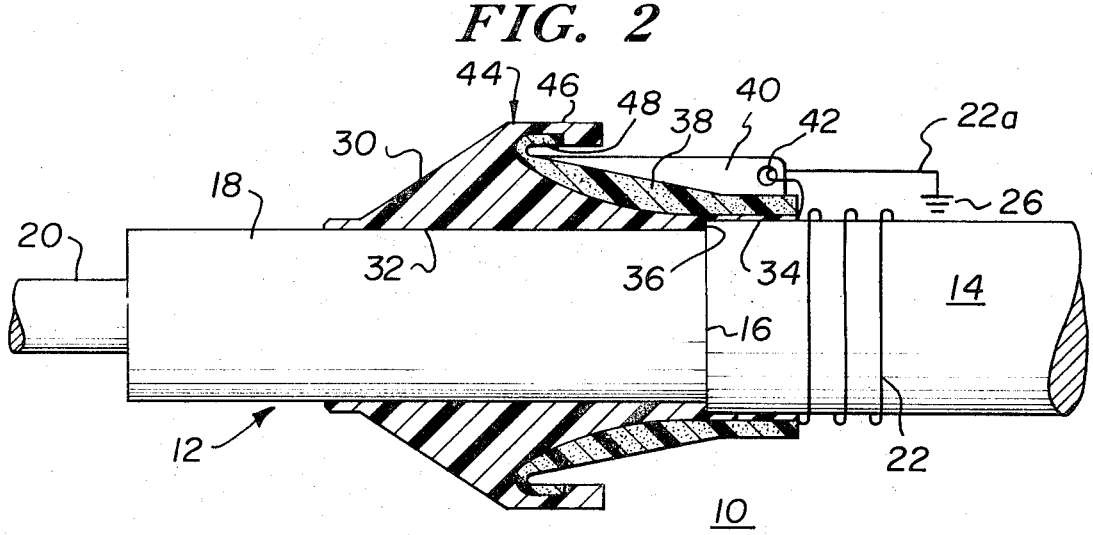
FIG. 3 is a side elevational view, in section, of the termination device or stress cone of FIG. 1 installed on a high voltage electrical cable.

Turning now to FIGS. 1 and 3, there is shown a termination device or stress cone 10 constructed in accordance with the concepts of the invention. As is best seen in FIG. 3, a high voltage cable 12, to be terminated by termination device 10, has a portion of its outer electrically conductive shield 14 removed to expose the interior conductor insulation 18. The transition from the outer electrically conductive shield 14 to the interior conductor insulation 18 is made sharp to provide a terminal rim 16. Finally, the insulation 18 is removed to expose the central conductor 20 which will carry the currents to and from the distribution system as required. Wrapped about the outer surface of the cable 12 are a series of concentric neutrals 22 which are bare uninsulated, tinned copper conductors whose number is determined by the size of the central conductor 20. It is desired that the concentric neutral wires 22 will have a current capacity equal to, or greater than the central conductor 20 of the cable 12. One of the concentric neutral wires 22a will be carried to a ground point 26 in order that the potential built up upon the outer surface of the electrically conductive shield 14 of the cable 12 may be returned to ground potential.

The inner member 30 is molded from electrically insulating elastomeric material such as filled ethylene propylene (EPDM) elastomer, which has in powdered form aluminum silicate or silicon dioxide fillers added. Extending through the inner member 30 is passage 32 of a diameter sufficient to accept therethrough the outer diameter of the insulation portion 18 of the cable 12. The passage 32 is enlarged adjacent the entrance to the termination device 10 to provide a portion 34 having a diameter sufficient to accept therein the electrically conductive shield 14 of cable 12. The transition from the diameter of passage 32 to the diameter of the enlarged portion 34 is made sharp to provide a terminal shoulder 36 against which the terminal rim 16 of the cable 12 will be positioned when the cable 12 is introduced within the termination device 10. The terminal shoulder 36, acting against the terminal rim 16, will prevent the termination device 10 from being advanced along the outer surface of the cable 12 or the cable 12 from being inserted too far into the termination device 10. The inner member 30 is sufficiently resilient so that it will be slightly stretched when applied to the outer surface of the cable 12 and when allowed to return to its stable condition will maintain a reasonably tight grip or interference fit with respect to the outer surface of the cable 12.

Molded along a portion of the outer surface of the inner member 30 is an outer member 38 molded of electrically conductive elastomeric material, such as, EPDM elastomer with a high percentage of highly conductive carbon black contained therein. The line of contact between the outer member 38 and the inner member 30 is required to be void free and is generally accomplished in a press mold operation. The completed inner member is placed in the mold and the material to form the outer member is then placed therein. The mold is sealed and the operation carried out in order that the proper relationship between inner and outer member is established during the vulcanizing operation which follows. Along a portion of the outer surface of the outer member 38 is formed a fin 40 which has an aperture 42 therein to receive one of the concentric neutral wires 22 of the cable 12 and to permit a single one of the wires 22a to be conducted to a grounding point 26 as was described above with reference to FIG. 3. It should be noted that the outer conductive elastomeric member 38 is not permitted to touch the electrically conductive shield 14 of the cable 12 within the termination device 10 itself. All contact between the electrically conductive elastomeric material of the outer member 38 and the fin 40 is by means of the concentric neutral wires 22. An annular ring 44 is arranged to ring the overall termination device body and is made of an outer segment 46 molded of electrically insulating elastomeric material over an inner segment 48 of electrically conducting elastomeric material in communication with the outer member 38 and fin 40. The annular ring 44 is spaced apart from the termination device body at its free end. In this manner, a leakage or tracking path for any charge which might exist upon the outer electrically conductive shield 14 of the cable 12 and the central conductor 20 which extends from the other end of the termination device or stress cone 10, is greatly increased. In normal practice the distance between the entrance to the termination device 10 and the bare conductor portion 20 of the cable 12 is made as long as possible to decrease the possibility of a corona discharge which might be destructive of the termination device 10, of the cable 12, or of the devices to which it is connected. The use of this annular ring provides the desired tracking length without increasing the overall length of the termination device 10.

Figure 2:
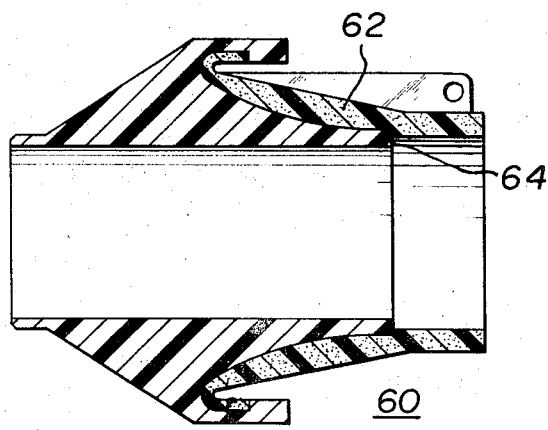
FIG. 2 is a side elevational view, in section, of another form of termination device or stress cone constructed in accordance with the concepts of the invention.

Turning now to FIG. 2 there is shown another form of termination device 60 wherein the portion of the inner member 30 which extends beyond the terminal shoulder 36 to the entrance of the passage enlargement 34 has been eliminated. This is often necessary where it is difficult to mold or form the portion of reduced thickness represented by the enlarged portion 34 of FIG. 1. In this case an additional thickness of outer member 62 is formed to provide a passage of sufficient diameter to receive the electrically conductive shield of cable 12. A terminal shoulder 64 is provided between the passage 32 and the enlarged portion adjacent the additional thickness of the outer member 62 near the entrance. In this case, direct contact will be had between the outer electrically conductive shield 14 of the cable 12 and such additional thickness of the outer member 38. However, this contact is again not relied upon to provide the necessary path for elimination of the potential on the outer electrical conductive shield. Rather, it is the concentric neutral wires 22 as are employed with respect to FIG. 1 which are used.

While there have been shown and described and pointed out the fundamental novel features of the invention as applied to the preferred embodiments, it will be understood that various omissions and substitutions and changes in the form and details of the devices illustrated and in their operation may be made by those skilled in the art, without departing from the spirit of the invention.

The embodiments of the invention in which an exclusive property or privilege is claimed are defined as follows:

1. A stress cone for terminating the electrically conductive shield of a high voltage cable having a central conductor, insulation covering said conductor, an electrically conductive shield surrounding said insulation and a plurality of concentric neutral wires wrapped thereabout, a portion of said electrically conductive shield being removed and providing a terminal rim, said cone comprising: an elongate hollow inner member molded of electrically insulating elastomeric material, said inner member having an outer surface flaring outwardly from each end generally towards the mid region of said inner member, said inner member having a central passage therethrough proportioned to resiliently receive therein the portion of said cable from which the electrically conductive shield had been removed, said inner member further comprising a terminal shoulder adjacent said central passage for receipt thereagainst of said terminal rim of said electrically conductive shield, said inner member terminating in an annular portion contiguous therewith and extending from said terminal shoulder to one end of said inner member, said annular portion being proportioned to provide an additional passage communicating with said central passage to resiliently receive therein the electrically conductive shield of said cable; an outer member of resilient electrically conductive elastomeric material molded around at least a portion of said inner member, said outer member having a skirt portion overlying said inner member annular portion, the entire junction between said inner member and said outer member being void free; and means conductively contiguous with said outer member for receiving therein at least one of said plurality of concentric neutral wires.

2. A stress cone for terminating the electrically conductive shield of high voltage cable as defined in claim 1 wherein said receiving means comprises a fin molded of electrically conductive elastomeric material on a portion of said outer member remote from its junction with said inner member, said fin having an aperture therethrough for receiving said neutral wires.

3. A stress cone for terminating the electrically conductive shield of a high voltage cable as defined in claim 1, further comprising an annular ring molded of electrically insulating elastomeric material and joined to said inner member positioned intimately about a portion of said outer member and partially extending beyond said outer member to provide an annular gap therebetween whereby the electrical leakage path from the electrically conductive shield of said cable to the conductor of said cable along said stress cone is greatly increased.

* * * * *